United States Patent
Stimpson

[11] 3,945,267
[45] Mar. 23, 1976

[54] ADJUSTABLE CONNECTOR

[75] Inventor: Donald E. Stimpson, Madison Heights, Mich.

[73] Assignee: Chrysler Corporation, Highland Park, Mich.

[22] Filed: Feb. 26, 1969

[21] Appl. No.: 802,423

[52] U.S. Cl. .............. 74/501 R; 24/115 G; 339/260
[51] Int. Cl.² .......................................... F16C 1/10
[58] Field of Search .................. 74/501, 501.5, 502; 24/115.7, 129 B, 257; 339/260

[56] References Cited
UNITED STATES PATENTS

| | | | |
|---|---|---|---|
| 1,152,892 | 9/1915 | Henry | 24/115.7 UX |
| 1,702,024 | 2/1929 | Smith et al. | 339/260 |
| 1,724,729 | 8/1929 | Ruttenberg et al. | 339/260 |
| 2,175,036 | 10/1939 | Sipe | 24/129 B |
| 2,737,825 | 3/1956 | Plockelman | 74/501 |
| 3,052,004 | 9/1962 | Wallshein | 24/257 X |

*Primary Examiner*—Samuel Scott
*Assistant Examiner*—F. D. Shoemaker
*Attorney, Agent, or Firm*—Talburtt & Baldwin

[57] ABSTRACT

A connector adjustably engages a wire which interconnects a control arm and a lever member in an automobile control system. Upon initial operation, proper adjustment of the components relative to each other is achieved automatically.

6 Claims, 5 Drawing Figures

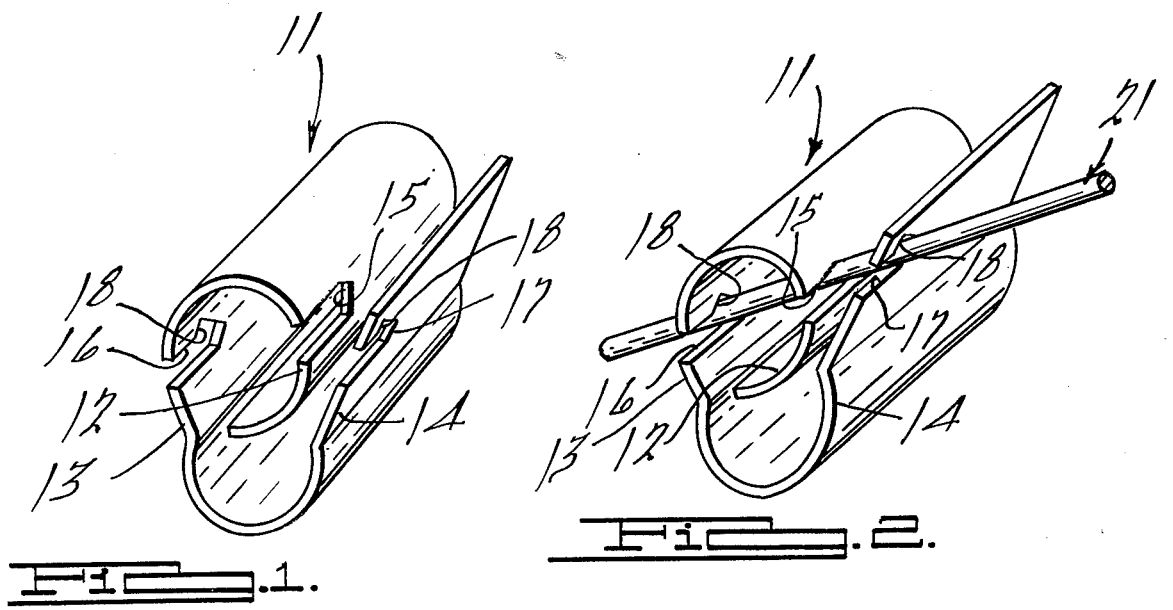
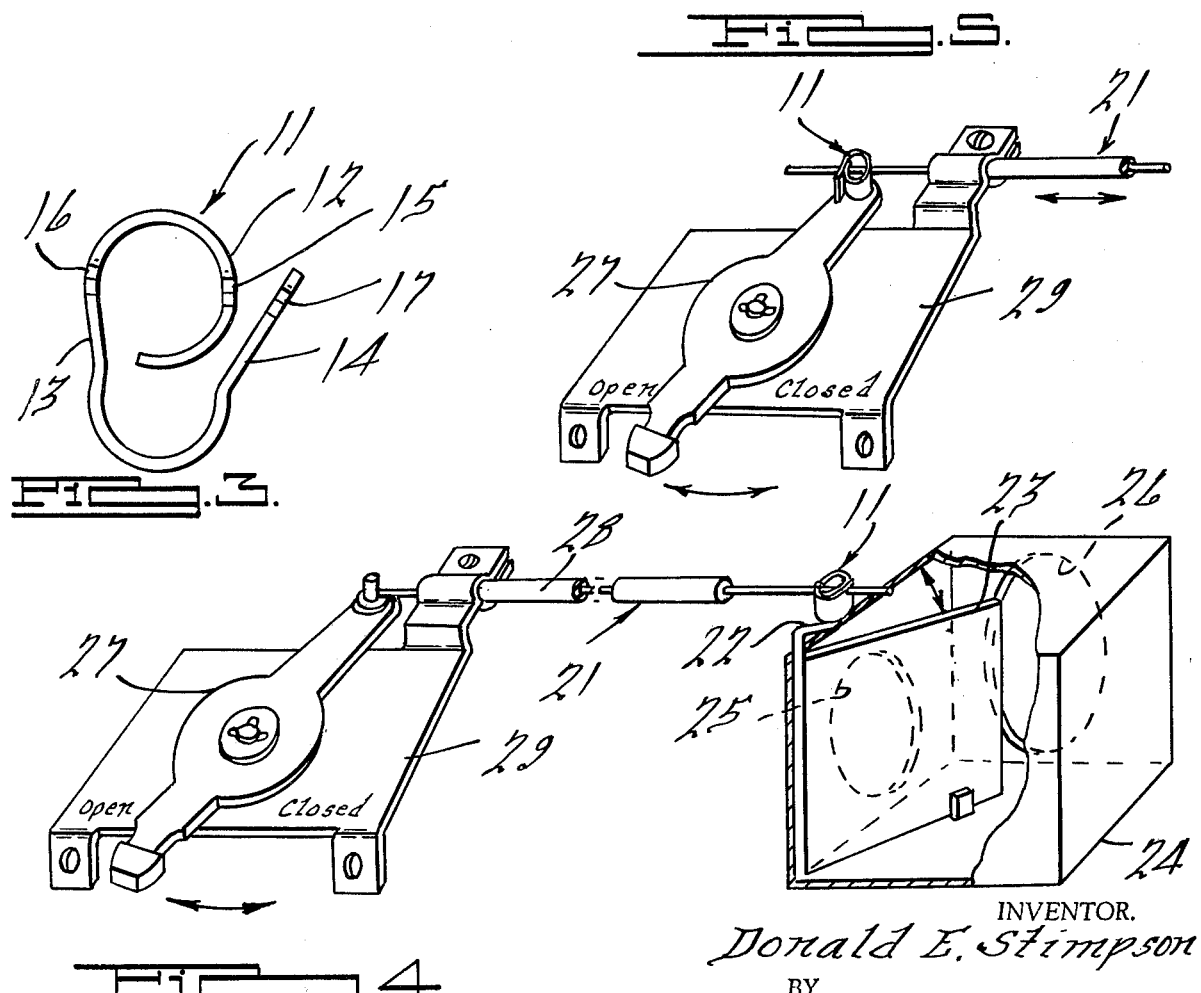

ADJUSTABLE CONNECTOR

BACKGROUND

This invention relates generally to an adjustable connector and to the installation thereof, particularly in automobile control systems for securing a wire, cable, conduit or other member in adjustable yet operable engagement with respect to another component to which the connector is also attached.

There are a number of control systems or mechanisms to be found in automotive vehicles and elsewhere that are coupled through wires or the like to manually operable members, such as push buttons, handles, knobs, rotatably mounted arms or other suitably mounted lever means. For example, automobile heating and cooling systems utilize wire connector to move levers and cranks or the like between various positions for control purposes. It is common to use a selectively movable control arm and crank interconnected by a length of wire for opening and closing doors, dampers, valves and the like in this and other systems. Manually operable control arms are usually mounted on the automobile dashboard at some distance from the crank and mechanism to be operated. The wire is fixedly secured at each of its ends to the control arm and lever to be operated respectively when the system is assembled. If the connections at the ends of the wire are made too close together or too far apart for the intended travel requirements of the system, the predetermined travel of these components will not be attained without further adjustment. Adjustment, due to the types of connection used heretofore, has required that the components be disconnected at one end of the wire.

SUMMARY OF THE INVENTION

It is a primary purpose and object of this invention to provide systems of the aforesaid general type which allows for automatic adjustment of the components relative to each other when the mechanism is first operated thus eliminating the need for manual adjustments of the type previously necessary. This is attained in the preferred embodiment disclosed by providing a connector which may be deformed to align a plurality of openings for receiving a wire or similar member therethrough in yieldable engagement. Generally speaking, the preferred connector must include openings for receiving the wire. These openings must be positioned in oppositely urged members of the connector in such a way that they are biased in opposite directions while engaging the wire thereby forcing opposite sides of the openings against the wire and causing engagement of the wire therebetween.

BRIEF DESCRIPTION OF THE DRAWING

FIGS. 1 and 2 are perspective views of a preferred connector for use in accordance with this invention showing it as it normally appears and in engagement with a wire.

FIG. 3 is an end view of the connector shown in FIGS. 1 and 2.

FIG. 4 is an illustrative partial showing of an automobile control system showing the connector embodiment of the preceding Figures in combination with other components of the system.

FIG. 5 is a partial showing of a system similar to that of FIG. 4 showing the connector in an alternate position with respect to the other components of the system.

DESCRIPTION OF THE PREFERRED EMBODIMENT

To accomplish the purposes of this invention the connector must yieldably and adjustably engage the wire when the normal travel requirements of the system are not attained. With such a connector it is a simple matter to provide any necessary adjustment by initially "setting" or positioning the connector on the wire through the operation of the system.

Referring to FIGS. 1–3, a connector 11 is shown which takes the general form of a spiraloid made from a single sheet or strip of resilient material, such as plastic or sheet metal. The spiraloid may be circular, square or as shown in the preferred embodiment of FIG. 3, it may be generally elliptical. The connector includes an inner portion 12 and outer portions 13 and 14 disposed to each side of inner portion 12 and is shaped to provide a spring-like deformable structure by means of which certain parts of these portions may be aligned. Openings 15, 16, and 17 are provided in the inner portion 12 and the outer portions 13 and 14 respectively. The openings are shaped to receive and engage a wire or other component as shown in FIG. 2. Openings 16 and 17 are generally oppositely disposed with respect to each other while opening 15 in inner portion 12 is unaligned with the other openings in order to allow for a spring-like action when the connector is deformed by forcing inner portion 12 downwardly and aligning the three openings to receive a wire member 21 or the like as shown in FIG. 2. The openings preferably take the form of spaced notches formed in a common edge of the sheet from which the connector is made and should preferably include small detents 18 near the ends thereof in portions 13 and 14 to facilitate connection on the wire.

Referring now to FIGS. 4 and 5, an illustrative system and preferred embodiment is described and its advantages are pointed out in more detail.

For installation in the system of FIG. 4 connector 11 is placed on wire 21 in yieldable or slidable engagement with it by squeezing or deforming the connector to align the three openings for receiving the wire. The connector is then mounted on another component, such as a crank 22. Crank 22 operates a door 23 between open and closed positions (full open position shown with door against a stop in order to control the flow of air through the system. The system is more or less schematically indicated here as including an enclosed box 24 having an air inlet opening 25 and an air outlet opening 26. Wire 21 is connected at its other end to another component, such as control arm 27. The wire housing or sleeve 28 is attached to a control mounting plate 29 by a bracket or the like. Control arm 27 is pivotally mounted on mounting plate 29 to provide for rotation between the "open" and "closed" positions indicated Rotation of control arm 27 moves wire 21 and changes the position of crank 22 and the position of door 23.

Crank 22 has a normal predetermined distance of travel, indicated by the arrow, through which it must move to provide the full open and closed positions of door 23. If wire 21 is engaged at the proper point by connector 11, door 23 will be placed in the closed position when control arm 27 is rotated to the position indicated as closed on mounting plate 29. Likewise, door 23 will be placed in the open position when the control arm 27 is rotated to open.

However, if the system is misadjusted so that the travel of crank 22 is prematurely limited and door 23 is only partially open when control arm 27 is in the open position due to the engagement of connector 11 on wire 21 at a point which makes the wire too long between the crank and control arm one can force control arm 27 to a full closed position moving wire 21 through connector 11 because of its yieldable engagement therewith. The proper adjustment of the system components relative to each other is then automatically and surely provided. A similar adjustment may be made if the travel of crank 22 is prematurely limited and door 23 is only partially closed when control arm 27 is in the closed position.

As shown in FIG. 5, connector 11 may alternately be mounted on control arm 27 and engage wire 21, the other end of the wire being fixedly secured to crank 22 (not shown in the Figures). Now if the system is misadjusted so that the travel of control arm 27 is limited by door 23 prematurely reaching its open or closed positions, one can force the control arm past this point by forcing control arm 27 to the desired position thus sliding the wire through the connector and achieving proper adjustment automatically.

In most automobile systems, it has been found satisfactory for the connector to be designed to engage a control wire or cable at forces of about 6–8 pounds and to yieldably engage the wire above that force such that slippage of the connector along the wire is possible. Sheet metal steel of about 0.020 stock thickness may be readily formed to a desired shape to provide a connector meeting these optimum requirements.

What is claimed is:

1. In combination; a wire, a connector engaging the wire and a member upon which the connector is mounted, the member being movable between at least two positions, the connector comprising a sheet of resilient material having the general form of a spiraloid and including an inner portion and outer portions disposed to each side of the inner portion, the inner portion defining an encircling loop for mounting the connector on the movable member, the outer portions defining oppositely disposed openings, the inner portion further defining an opening which is out of alignment with the other openings, the openings being adapted to cooperatively engage the wire when the connector is deformed such that the openings are substantially aligned and the wire is inserted therethrough whereby the wire is connected to the movable member by the connector and the connector is automatically adjustable to a predetermined position on the wire when the movable member is moved between the two positions.

2. The combination of claim 1 wherein the movable member is a control arm in an automobile control system for selectively controlling the flow of air through the system and the arm has first and second control positions, the connector is mounted on the control arm and yieldably engages the wire whereby the connectos is automatically moved to the proper point on the wire to allow full travel of the arm between the control positions after the arm is initially operated.

3. The combination of claim 1 wherein the movable member is a lever in an automobile control system for operating a door and controlling the flow of air in the system and the lever has first and second positions in which the door is substantially open or closed respectively; the connector is mounted on the lever and yieldably engages the wire whereby the connector is automatically moved to the proper point on the wire to provide full travel of the lever between the positions after the wire is initially operated to move the lever.

4. In a combination of the type including a control member movable between at least two positions over a predetermined travel distance, an operating member movable between at least two positions over a predetermined travel distance and a wire connecting the two members together such that movement of the control member causes movement of the operating member, the improvement comprising yieldable connector means carried by one of the members for yieldably and operably engaging the wire to connect the member thereto whereby initial movement of the control member will cause the wire to slide through the connector means to provide a certain connecting length of wire between the two members, when the connecting length is not provided initially, so that the full predetermined travel of both members is assured during subsequent operation.

5. The combination of claim 47 wherein the connector means comprises a body of resilient material having three portions for engaging the wire, two outer portions and an inner portion positioned between the outer portions, said outer portions having aligned openings therein for receiving the wire, the inner portion having an opening which may be brought into alignment with the others for receiving the wire by deforming the body slightly, the resiliency of the body causing the wire to be yieldably engaged by the body portions when the deforming action ceases.

6. In a control system having movable control means in the form of a flexible cable comprising a wire and wire sheath, the wire being operatively connected to a movable actuator device at one end and to a remotely located movable actuable device at the other end, the movable actuator device being movable by application of a normal manipulation force between first and second extreme selection positions, and the movable actuable device being movable between first and second extreme operating positions in response to movement of the actuator device, the invention of adjustment means to locate and correlate the extreme selection positions of the movable actuator device relative to the extreme operating positions of the movable actuable device so that the movable actuator device is located in at least one of the extreme selection positions at the same time that the movable actuable device is located in one of the extreme operating positions and comprising:

first connection means connecting said wire to said movable actuable device whereby manipulative movement of said wire causes responding manipulative movement of said movable actuable device, second connection means connecting said wire to said movable actuator device whereby manipulative movement of said movable actuator device causes responding movement of said wire, and at least one of the connection means comprising a separate one-piece adjustment clip means having self-releasing resilient spring-like gripping jaw means adjustably connecting the wire to one of the devices and permitting sliding positional adjustment between the wire and the one of the devices by self-release upon application of a predetermined adjustment force in excess of the normal manipulation force when the positions of the devices are not properly correlated thereby to adjust the relative positions of the devices and thereafter permanently holding the wire and the one of the devices in the adjusted position during subsequent applications of normal manipulation forces, said self-releasing resilient spring-like gripping jaw means being formed on the edges of opposite spaced side walls of said clip means and defining an open wire receiving channel permitting the wire to be associated with said jaw means of the clip means by movement transverse to the actuating movement of the wire.

* * * * *

UNITED STATES PATENT AND TRADEMARK OFFICE
CERTIFICATE OF CORRECTION

PATENT NO. : 3,945,267
DATED : March 23, 1976
INVENTOR(S) : Donald E. Stimpson

It is certified that error appears in the above-identified patent and that said Letters Patent are hereby corrected as shown below:

Column 1, line 17, "connector" should read --cables--;

line 40, "allows" should read --allow--.

Column 2, line 59, after "indicated" insert a period (.);

line 68, "closed" should read --"closed"--.

Column 3, line 2, "open" should read --"open"--;

line 5, "open" should read --"open"--;

line 9, "closed" should read --"closed"--;

line 16, "closed" should read --"closed"--;

line 22, "open or closed" should read --"open" or "closed"--.

Column 4, line 24, the numeral "47" should read --4--.

Signed and Sealed this

Twenty-fourth Day of August 1976

[SEAL]

Attest:

RUTH C. MASON
Attesting Officer

C. MARSHALL DANN
Commissioner of Patents and Trademarks